United States Patent
Howard et al.

(10) Patent No.: US 8,200,173 B2
(45) Date of Patent: Jun. 12, 2012

(54) GATED RF CONTROL CHANNEL DEMODULATION METHODS AND APPARATUSES

(75) Inventors: Michael Alexander Howard, Cardiff, CA (US); Babak Aryan, San Diego, CA (US); Charles Wheeler Sweet, III, San Diego, CA (US); Xiaoyin He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 12/411,272

(22) Filed: Mar. 25, 2009

(65) Prior Publication Data

US 2010/0248642 A1    Sep. 30, 2010

(51) Int. Cl.
*H01Q 11/12* (2006.01)
*H04B 1/04* (2006.01)

(52) U.S. Cl. ............ 455/127.1; 455/127.5; 455/343.1; 455/343.2; 455/343.3; 455/343.4; 455/458; 455/574; 370/311; 370/329

(58) Field of Classification Search ........... 455/127.1, 455/127.5, 343.1, 343.2, 343.3, 343.4, 574, 455/458; 370/310, 311, 314, 329
See application file for complete search history.

(56) References Cited

U.S. PATENT DOCUMENTS

| | | | |
|---|---|---|---|
| 7,508,781 B2 * | 3/2009 | Liu et al. | 370/311 |
| 2005/0064829 A1 | 3/2005 | Kang et al. | |
| 2006/0280198 A1 * | 12/2006 | Lee et al. | 370/445 |
| 2007/0219719 A1 | 9/2007 | Okada et al. | |
| 2008/0008510 A1 | 1/2008 | Lee et al. | |
| 2008/0070497 A1 | 3/2008 | Pon | |
| 2008/0242313 A1 | 10/2008 | Lee et al. | |

OTHER PUBLICATIONS

International Search Report and Written Opinion—PCT/US2010/028516, International Search Authority—European Patent Office—Aug. 6, 2010 (060357).
Lee et al., LDC Over 1xEV-DO, U.S. Appl. No. 60/722,140, filed Sep. 29, 2005, Qualcomm Incorporated.

* cited by examiner

*Primary Examiner* — Arnold Kinkead
*Assistant Examiner* — Richard Tan
(74) *Attorney, Agent, or Firm* — Shyam K. Parekh; Mary A. Fales (57) ABSTRACT

Methods and apparatuses are provided for use in devices that are enabled to receive control channel information over a link having a plurality of interlaced slots. The methods and apparatuses may be implemented to selectively disable/enable one or more circuits within a receiver path at selected times.

33 Claims, 4 Drawing Sheets

GATED RF CONTROL CHANNEL DEMODULATION METHODS AND APPARATUSES

BACKGROUND

1. Field

The subject matter disclosed herein relates to electronic devices, and more particularly to methods and apparatuses for use in devices enabled to receive control channel information.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information. Indeed, it is not uncommon for some devices to be enabled to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS) including regional satellite systems. SPS radios, for example, may receive wireless SPS signals that are transmitted by a plurality of orbiting satellites of a GNSS. The SPS signals may, for example, be processed to determine a global time, an approximate or accurate geographical location, altitude, and/or speed associated with a device having the SPS radio.

Certain types of devices may be enabled to receive and process wireless signals continuously or for extended periods of time. For example, a receiver device that is coupled to a non-exhaustive power supply may operate for extended periods. To the contrary, some types of devices may operate based on limited battery power. To conserve power such devices may be enabled to operate in different modes. Some of these operational modes may significantly reduce the electrical power consumed by the device. For example, certain portable devices may cycle between awake and sleep modes, wherein during a sleep mode certain portions of the device may be turned off.

SUMMARY

Methods and apparatuses are provided for use in devices that are enabled to receive control channel information over a link.

In accordance with certain aspects of the present description, for example, a method may include receiving control channel information in a receiver path of a device, wherein the control channel information may be transmitted over a link having a plurality of applicable slots interlaced with a plurality of non-applicable slots. Here, the control channel information may be transmitted over at least a portion of the plurality of applicable slots. The method may further include disabling operation of one or more circuits in the receiver path during a time corresponding to at least a portion of at least one of the plurality of non-applicable slots.

By way of example but not limitation, the disabling operation may include powering-down at least a portion of the one or more circuits, which may be done in a selective manner, for example, based, at least in part, on a decision to conserve power. In certain example implementations, the one or more circuits may include at least a portion of an analog RF receive-chain and/or at least a portion of a baseband digital receive-chain. In certain example implementations, the control channel information may include ephemeris and/or other like data that may be associated with an SPS, GNSS, and/or the like.

In accordance with certain other aspects of the present description, for example, an apparatus may include a receiver path having one or more circuits that may be operatively enabled to receive control channel control information transmitted over a link having a plurality of applicable slots interlaced with a plurality of non-applicable slots, wherein the control channel information may be transmitted over at least a portion of the plurality of applicable slots. The apparatus may also include a controller that may be operatively enabled to disable operation of one or more circuits in the receiver path, for example, during a time corresponding to at least a portion of at least one of the plurality of non-applicable slots.

By way of example but not limitation, the apparatus may include a Low Duty Cycle (LDC) terminal, and the receiver path may be part of a CDMA network modem that may be operatively enabled to support wireless data communication via a CDMA2000 1xEV-DO network, and/or the like.

In accordance with certain further aspects of the present description, for example, an article of manufacture may be provided that includes a computer readable medium having stored thereon computer readable instructions that, if implemented by one or more processing units of a special purpose computing device, operatively enable the one or more processing units to receive of control channel information by a receiver path, wherein the control channel information may be transmitted over a link that includes a plurality of applicable slots interlaced with a plurality of non-applicable slots, and wherein the control channel information may be transmitted over at least a portion of the plurality of applicable slots. Further, the one or more processing units may disable operation of one or more circuits in the receiver path during a time corresponding to at least a portion of at least one of the plurality of non-applicable slots.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Methods and apparatuses are provided for use in devices that are enabled to receive control channel information over a link having a plurality of interlaced slots. The methods and apparatuses may be implemented to selectively disable/enable one or more circuits within the device, e.g., within a receiver path, at selected times. For example, some of the plurality of interlaced slots may be considered applicable to the device while other interlaced slots may be considered non-applicable to the device. As such, one or more circuits within the receiver path may be enabled to receive the information transmitted via the applicable slots and disabled at times associated with all or part of the non-applicable slots. Thus, for example, the amount of electrical power that may be consumed by the device may be reduced by selectively disabling the one or more circuits.

Figure 1:
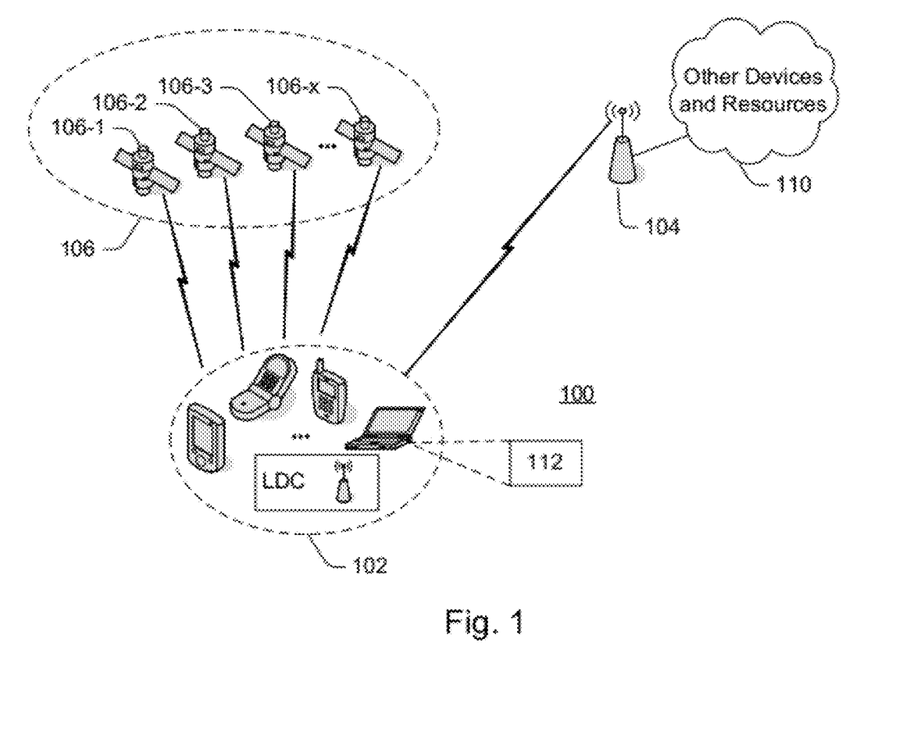
FIG. 1 is a block diagram illustrating an exemplary environment that includes a device enabled to receive control channel information over a link, in accordance with an implementation.

FIG. 1 is block diagram illustrating an exemplary environment 100 that includes a device 102 enabled to receive control channel information over a link, in accordance with an implementation of the present description. As used herein, unless otherwise specified, "control channel information" may include any type of data that may be communicated over a link to device 102. Here, for example, the link may include a forward link, some other type of communication link and/or links.

Wireless environment 100 is intended to be representative of any system(s) or a portion thereof that may include at least one device 102 enabled to at least receive wireless signals. In this example, device 102 is illustrated as being enabled to receive wireless signals from another wireless device 104 and also (optionally) a navigation system 106 (e.g., a satellite positioning system (SPS), and/or the like). Device 102 may also be enabled to transmit signals, for example, to wireless device 104 and/or other networked devices/resources as represented by cloud 110 in FIG. 1.

Device 102 may, for example, include a mobile device or a device that while movable may be primarily intended to remain stationary. Thus, as used herein, the terms "device", "mobile device", and/or "terminal", may be used interchangeably as each term is intended to refer to any single device or any combinable group of devices that may transmit and/or receive wireless signals. The terms "receive" and "acquire" are used interchangeably herein and are both intended to represent the reception of a wireless signal such that information that is carried via the wireless signal may be operatively acquired by the receiving device.

With this in mind and by way of example but not limitation, as illustrated using icons in FIG. 1, device 102 may include a mobile device such as a cellular phone, a smart phone, a personal digital assistant, a portable computing device, and/or the like or any combination thereof. In certain implementations, device 102 may, for example, take the form of a personal navigation device (PND), personal navigation assistant (PNA), a tracking device, a Low Duty Cycle (LDC) device, and/or the like. For example, device 102 may include a tracking device and/or the like. In other exemplary implementations, device 102 may take the form of a machine that is mobile or stationary. In still other exemplary implementations, device 102 may take the form of one or more integrated circuits, circuit boards, and/or the like that may be operatively enabled for use in another device.

Regardless of the form of device 102, device 102 may include at least one radio receiver and/or transceiver, which is represented in this example by a modem 112. Here, for example, modem 112 may include a CDMA modem/radio and/or other like wireless interface that may be enabled to at least acquire control channel information over a link. The link transmission may have a structure that includes a plurality of interlaced slots. As described in greater detail below, in accordance with certain exemplary aspects of the present description, one or more circuits (e.g., within modem 112) may be enabled/disabled at selected times, such as, when non-applicable slots within the control channel link structure may be transmitted. Such a technique may, for example, conserve power consumption within device 102.

As shown in the example of FIG. 1, device 102 may be enabled to receive a link from wireless device 104. Wireless device 104 may be enabled to communicate with and/or otherwise operatively access other devices and/or resources as represented simply by cloud 110. For example, cloud 110 may include one or more communication devices, systems, networks, or services, and/or one or more computing devices, systems, networks, the Internet, various computing and/or communication services, and/or the like, or any combination thereof.

Thus, wireless device 104 may, for example, be representative of any wireless communication system or network that may be enabled to receive and/or transmit wireless signals. By way of example but not limitation, wireless device 104 may include a wireless wide area network (WWAN), a wireless local area network (WLAN), a wireless personal area network (WPAN), a wireless metropolitan area network (WMAN), a Bluetooth communication system, WiFi communication system, Global System for Mobile communications (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, by way of example but not limitation, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Such location determination techniques described herein may also be used for any combination of WWAN, WLAN, WPAN, WMAN, and/or the like.

In other example implementations, device 102 may also communicate with other devices via wired and/or wireless transmitted signals. Device 102 may also transmit signals to wireless device 104, e.g., over a reverse link.

In certain (optional) implementations, device 102 may be enabled to receive wireless signals from at least one navigation system 106 which is illustrated in FIG. 1 as a satellite positioning system (SPS) having a plurality of SPS signal transmitting satellites 106-1, 106-2, 106-3, . . . , 106-x. Those skilled in the art will recognize that navigation system 106 may include additional transmitting and/or other supporting resources in addition to or instead of the satellites as illustrated.

The space vehicles (SVs) of navigation system 106 may be enabled to transmit a unique wireless signal (SPS signal) of which, at least a portion, may be received by device 102 and used in some manner for navigation and/or tracking, for example, to determine a time, a range, a location, a position, etc. The specific navigation signaling and location determining techniques may vary depending on the particular navigation system(s) being used. Such SVs may be enabled to transmit one or more signals at the same or different carrier frequencies. For example, a GPS satellite may be enabled to transmit L1 C/A and L1C signals in the same band, as well as, the L2C and L5 signals at other carrier frequencies, etc. Furthermore, such SPS signals may include encrypted signals.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting SVs. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

To estimate its location, device 102 may determine pseudorange measurements to SVs that are "in view" of its receiving radio using well known techniques based, at least in part, on detections of PN codes in signals received from the SVs. Such a pseudorange to a SV may be determined based, at least in part, on a code phase detected in a received signal marked with a PN code associated with the SV during a process of acquiring the received signal at the receiving radio. To acquire the received signal, device 102 may, for example, be enabled to correlate the received signal with a locally generated PN code associated with a SV. For example, device 102 may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above. Device 102 may be enabled to receive and/or otherwise access ephemeris data associated with an SPS.

Thus, in certain implementations, device 102 may be enabled to determine its location in such a manner or other like manner without additional support from other devices. In other implementations, however, device 102 may be enabled to operate in some manner with one or more other devices to determine its location and/or to support other navigation related operations. Such navigation techniques are well known.

In certain implementations, device 102 may be enabled to receive SPS signals from one or more GNSS, such as, for example, GPS, Galileo, GLONASS, Compass, or other like system that uses a combination of these systems, or any SPS developed in the future, each referred to generally herein as a SPS. As used herein, an SPS will also be understood to include pseudolite systems.

Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites may be useful in situations where signals from an orbiting SV might be unavailable, such as in tunnels, mines, buildings, urban canyons or other enclosed areas. Another implementation of pseudolites is known as radio-beacons. The terms "satellite" and "SV", as used herein, are interchangeable and intended to include pseudolites, equivalents of pseudolites, and possibly others. The term "SPS signals", as used herein, is intended to include SPS-like signals from pseudolites or equivalents of pseudolites.

Figure 2:
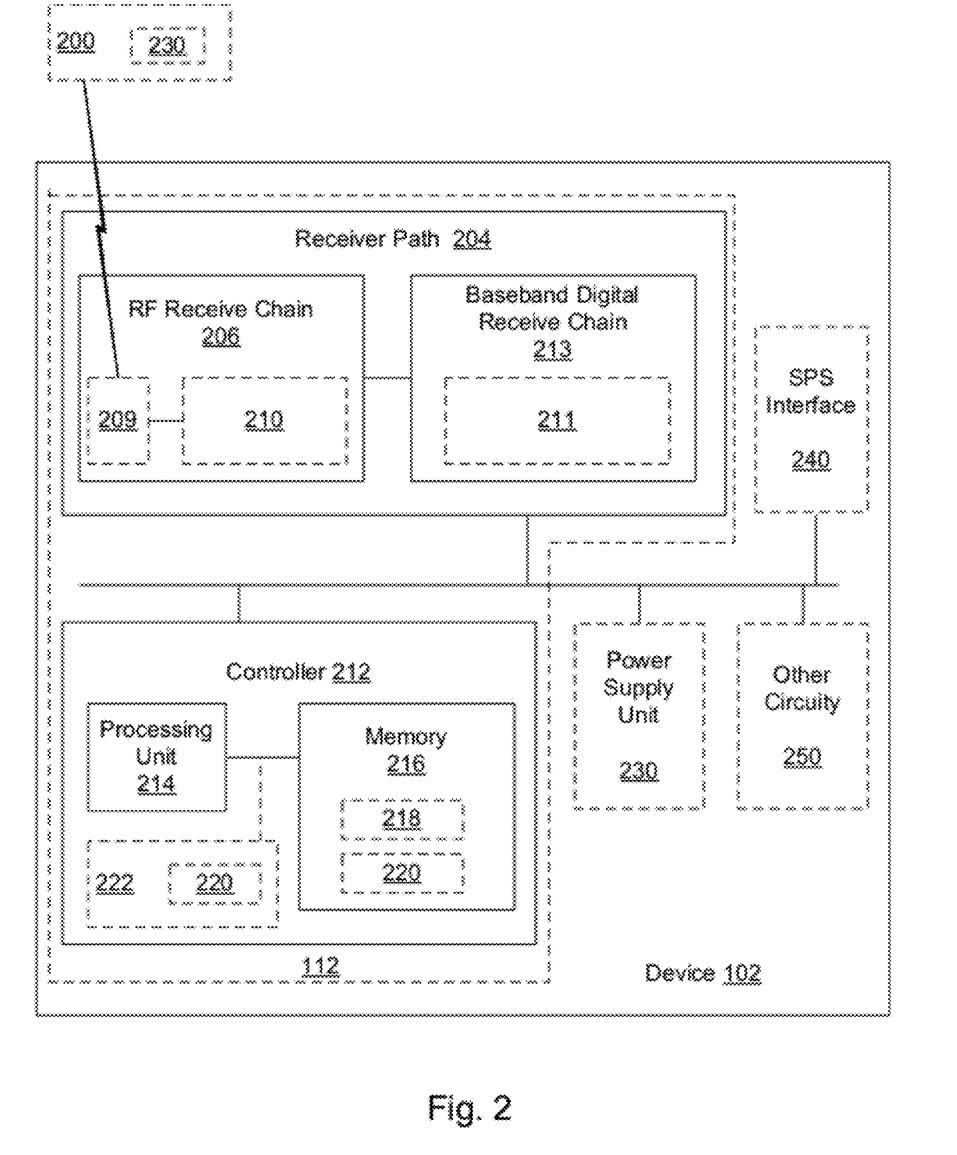
FIG. 2 is a block diagram illustrating certain features of an exemplary device that may, for example, be implemented in the environment of FIG. 1, and which may include one or more circuits within a receiver path that may be disabled at selected times.

Reference is now made to FIG. 2, which is a block diagram illustrating certain further features of device 102 that may, for example, be implemented in the environment of FIG. 1, and which may include one or more circuits within a receiver path 204 that may be disabled at selected times.

As shown in this example implementation, device 102 may include a wireless interface as represented here by modem 112. The wireless interface may be enabled to receive and/or transmit wireless signals. Here, for example, a receiver path 204 is illustrated that may be enabled to acquire control channel information 200 over a link. By way of example but not limitation, receiver path 204 may include an RF receive chain 206 and a baseband digital receive chain 213. Here, for example, RF receive chain 206 may include an antenna 209 and one or more circuits 210. Circuits 210 may, for example, include various circuits and/or circuit components operatively enabled to process the link transmitted signal as received by antenna 209 and provide a corresponding electrical signal to baseband digital receive chain 213. Thus, for example, in certain implementations, circuits 210 may represent one or more amplifiers (e.g., a low noise amplifier (LNA), etc.), one or more filters, one or more mixers, one or more signal generators (e.g., a voltage controlled oscillator (VCO), etc.), a phase-locked loop (PLL), and/or other like analog and/or digital circuits that are operatively arranged to process (e.g., demodulate, etc.) the RF signal accordingly. In certain example implementations, circuits 210 may represent one or more sampling circuits, one or more analog to digital converters, and/or other like circuits.

By way of example but not limitation, baseband digital receive chain 213 may include one or more circuits 211. Circuits 211 may, for example, include various circuits and/or circuit components operatively enabled to process the electrical signal from RF receive chain 206 as needed to reproduce command channel information 200 as originally modulated and transmitted over the link. Circuits 211 may, for example, be enabled to convert an analog signal to a corresponding digital signal and to further process the digital signal in some manner, if not already accomplished by circuits 210. Thus, for example, in certain implementations, circuits 211 may represent one or more sampling circuits, one or more analog to digital converters, and/or the like. In certain example implementations, circuit 211 may represent one or more correlators, one or more signal processors, one or more digital filters, memory, and/or other like circuits and/or processing units.

In accordance with certain aspects of the present description, one or more of circuits 210 and/or 211 may be selectively enabled/disabled in some manner. For example, one or more of circuits 210/211 may be operatively enabled to be selectively powered-on or off (e.g., gated) by a controller 212. For example, controller 212 and/or circuits 210/211 may represent one or more switches and/or the like that are responsive to one or more signals from controller to selectively enable/disable one or more of circuits 210/211 by turning electrical power (e.g., as supplied by power supply unit 230) on/off.

Controller 212 may, as illustrated in this example implementation, include one or more processing units 214 and/or the like that may be operatively coupled to memory 216. Controller 212 may, for example, be operatively enabled based, at least in part, on instructions 220. Instructions 220 may be provided in memory 216, for example. In certain implementations, instructions 220 may be provided by a computer readable medium that may be operatively accessible to processing unit 214 and/or otherwise operatively coupled to memory 216. Instructions 220 may, for example, operatively enable processing unit 214 to perform in accordance with the techniques provided herein to selectively enable/disable one or more circuits 210/211.

Instructions 220 may, for example, operatively enable processing unit 214 to make decisions associated with such techniques, e.g., whether to enable/disable one or more circuits 210/211 based on various factors. By way of example but not limitation, one factor may be associated in some manner with a decision to conserve power as represented in FIG. 2 by item 218 in memory 216. Here, for example, a decision to conserve power may be dynamically determined based on information associated with power supply 230, an SPS interface 240, and/or other circuitry 250 within device 102. Thus, for example, a decision to conserve power may be determined based, at least in part, on a state and/or mode of power supply 230 (e.g., battery level, external power connection, etc.). A decision to conserve power may, for example, be determined based, at least in part, on a state and/or mode of SPS interface 240 (e.g., ephemeris data update desired or not desired, etc.). A decision to conserve power may, for example, be determined based, at least in part, on a state and/or mode of other circuitry 250 (e.g., based on transmitted and/or received information, based on a timer, based on one or more sensors (e.g., motion, etc.), etc.).

Other circuitry 250 may represent any circuitry that may be of use to the functioning and/or purpose of device 102. By way of example but not limitation, in certain implementations, other circuitry 250 may include sensors and/or other circuitry that may be used to detect motion, acceleration, velocity, temperature, altitude, etc. Other circuitry 250 may include one or more processors, user interfaces, display devices, network interfaces, peripheral device interfaces, etc.

Figure 3:
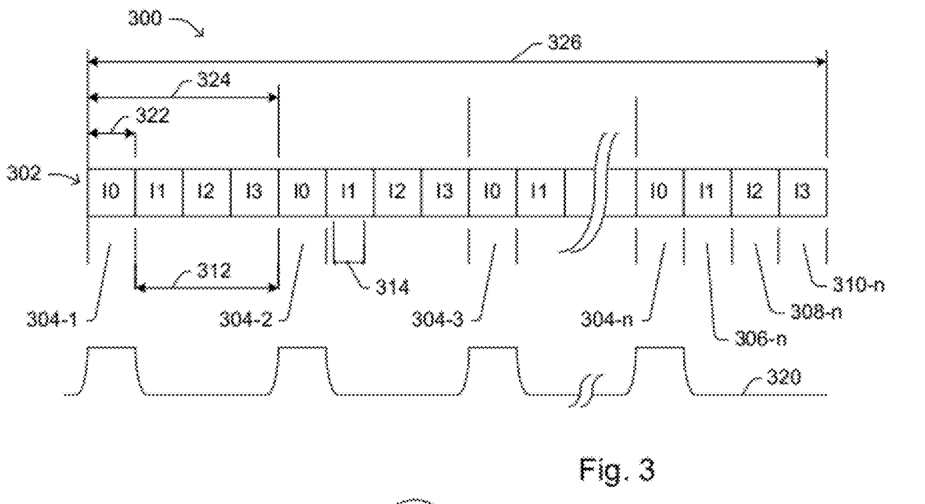
FIG. 3 is a time-line diagram illustrating certain aspects associated with exemplary control channel information as may be received by a device, for example, as in FIG. 2, over a link having a plurality of interlaced slots.

Reference is now made to FIG. 3, which is a time-line diagram 300 illustrating certain aspects of an exemplary link transmission structure 302 having a plurality of interlaces (here, e.g., I0, I1, I2, and I3) within which control channel information may be received by device 102. In this example, interlaces I0, I1, I2, and I3 each have a plurality of slots. For example, interface I0 includes slots 304-1, 304-2, 304-3, ..., 304-n. For drawing simplification, only slots 306-n, 308-n and 310-n are shown as being associated with interlaces I1, I2 and I3, respectively.

In this example, time period 326 may represent the time associated with a control channel packet transmission, time period 324 may represent the total time for one slot from each interlace to be transmitted, and time period 322 may represent the time for one slot to be transmitted. Time period 312 may, for example, represent the time available to demodulate, decode, and/or otherwise process information that may have been transmitted in slot 304-1 of interlace I0.

In accordance with certain aspects of the present description, one or more of circuits 210 and/or 211 may be selectively enabled at least during time period 322. In accordance with certain aspects of the present description, one or more of circuits 210 and/or 211 may be selectively disabled during all or part of time period 312. In certain example implementations, one or more of circuits 210 and/or 211 may be selectively disabled during all or part of a time period 314, which may be less than time period 326 and possibly less than time period 322. In certain example implementations, one or more of circuits 210 and/or 211 may be selectively disabled during all or part of the time period 326–324 (326 minus 324) as decided by controller 212.

By way of example but not limitation, an exemplary enable/disable control signal 320 is shown in FIG. 3. Here, signal 320 may be used to enable one or more of circuits 210 and/or 211 during time periods corresponding to at least slots 304-1, 304-2, 304-3, ..., 304-n, which in this example may represent "applicable slots" (here, associated with interlace I0), and disabling one or more of circuits 210 and/or 211 during all or part of the time periods corresponding to other "non-applicable" slots (here, associated with interlaces I1, I2, and I3). As used herein, "applicable" slots and/or interlaces refers to slots and/or interlaces that include transmitted control channel information intended for and/or that may otherwise be useful to device 102. Conversely, as used herein, "non-applicable" slots and/or interlaces refers to slots and/or interlaces that may or may not include transmitted control channel information. If a "non-applicable" slot and/or interlace does include transmitted control channel information, then such information may not be intended for and/or that may otherwise not be useful to device 102 (e.g., it may be intended for another device, etc.).

Here, for example, signal 320 when "high" may enable one or more of circuits 210 and/or 211, and when "low" may disable one or more of circuits 210 and/or 211. One or more similar or unique signals/patterns, such as signal 320, may be associated with one or more of circuits 210 and/or 211. In some implementations, for example, it may be beneficial to enable or disable certain circuits earlier and/or later than other circuits. Signal 320 may, for example, represent an actual signal and/or a data. Signal 320 may, for example, be generated and/or otherwise established, at least in part, by controller 212 (FIG. 2).

The following example implementation of an LDC device may, for example, take advantage of the time-line in FIG. 3 for a link 302 of CDMA (e.g., 1xEV-DO) network where at least one applicable interlace (e.g., interlace 0) is being used to transmit control channel information.

A (LDC) device 102 operating in such a 1xEV-DO network may utilize the link control channel to receive messages from wireless device 104 (e.g., an access network). A link control channel packet may be sent as a 38.4 kbps, 16-slot or a 76.8 kbps, 8-slot physical layer packet, for example, over time period 326. Due to the interlaced structure of the DO link, successive slots of a multi-slot physical layer packet may be transmitted every 4 slots, or 6.67 ms, for example. Here, for example, time period 324 may be 6.67 ms and time period 322 may be 1.667 ms. Transmission of a control channel packet actually spans time period 326 of 106.67 ms (e.g., to allow for a total of 64 slots (16×4) for the 38.4 kpbs rate) or 53.33 ms (e.g., to allow for a total of 32 slots (8×4) for the 76.8 kbps rate).

To reduce the amount of modem processing (e.g., to conserve power), it may be desirable to terminate control channel processing as early as possible. Here, for example, a decoder process may run after each successive slot of a multi-slot packet is demodulated and repeat combined. Control channel processing may be terminated when the results of the decoder process successfully passes a CRC of the decoded packet.

In accordance with an aspect of the present description, additional power conservation may be experienced in device 102 during control channel processing by disabling portions of receiver path during time periods associated with non-applicable slots (e.g., of unused interlaces).

With regard to FIG. 3, signal 320 (e.g., RF_CTL) shows that, for example, one or more circuits 210 of RF receive chain 206 may be powered on for a single-slot aligned with the active (applicable) interlace, which in this example is interlace 0 (I0). In this example, the on and off transitions of RF_CTL are shown as non-zero rise and fall times to illustrate that an RF receive chain circuitry may benefit from some amount of transition time between stable on and off states. In certain implementations, only portions of the RF receive chain may actually be turned off, e.g., one or more circuits 210 that may have acceptable on/off transition times. In certain implementations, one or more circuits 210 in a CDMA RF receiver design, such as an LNA, a mixer and/or a receive baseband filter may be powered on and off quickly, while a VCO and/or a PLL may be left active (on) as such may have substantial warm-up times with respect to the DO slot time of 1.667 ms (e.g., time period 322).

In certain implementations, it is thought that combined an LNA, a mixer and a baseband filter may consume up to about one-half to two-thirds of the total power used by an RF receive chain 206. Thus, in a single applicable interlace example as shown in FIG. 3, device 102 may save about one-half to two-thirds of the total power used by an RF receive chain 206 over 75% of the time until the control channel information is successfully decoded.

Just as one or more circuits 210 may be disabled in the example of FIG. 3 during interlaces I1, I2 and I3, pilot finger and/or other like processing may be disabled during this time period (e.g., time periods 312, 314). Thus, for example, one or more circuits 211 of baseband digital receive chain 210 may be disabled in some manner during such and/or similar time periods (e.g., to conserve power). In certain implementations (e.g., in stationary or pedestrian speed channel environments), the frequency and associated time drift that may be experienced by disabling one or more circuits 211 for a three slot duration or so may only have minimal impact on a baseband SINR. In certain implementations, a decision to conserve power may take into account the speed and/or other factors relating to the wireless environment. Thus, if device 102 is moving faster than a certain speed, the impact on a baseband SINR experienced by disabling one or more circuits 211 for a three slot duration may prove unacceptable and hence such disabling may not occur and/or the timing may be adjusted in some manner.

In certain implementations, system simulations may, for example, be run to quantify "worst case" or other like potential losses and/or determine how such losses may or may not ultimately impact the time taken to early terminate a control channel. In some implementations it may be beneficial, for example, to turn one or more circuits 210 of RF receive chain 206 back on earlier (e.g., several half-slots earlier), which may help tracking loops and/or the like to stabilize quicker for the active interlace(s).

In certain implementations, the amount of control channel information sent may be larger than a single 1024-bit MAC layer packet. As such, fragmentation of such a control channel message may occur, causing the information to be split across multiple physical layer packets and which may utilize additional interlaces. To accommodate this, techniques may be implemented in which normal control channel preamble detection is employed during the first slot of additional interlaces to create an on/off RF receive chain control bit or signal for successive slots of each interlace.

Figure 4:
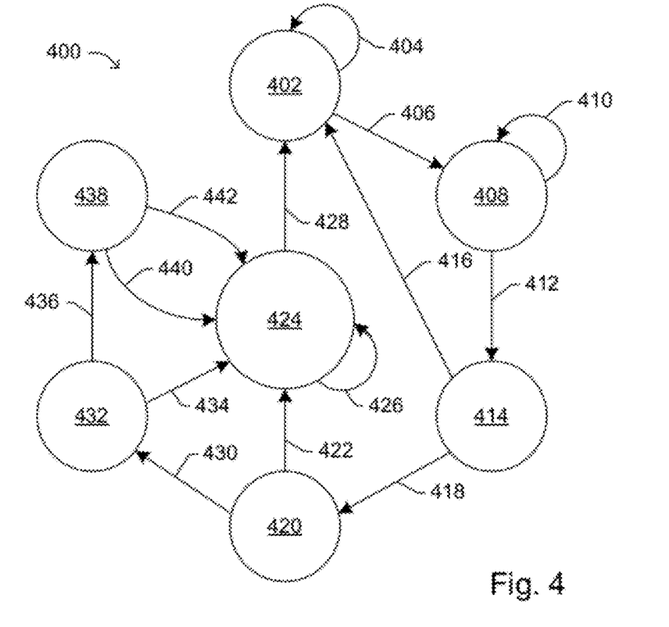
FIG. 4 is an illustrative state diagram showing an exemplary process that may be implemented in a device, for example, as in FIG. 2, to receive control channel information over a link having a plurality of interlaced slots.

An example of such a technique is illustrated in state diagram 400 of FIG. 4. State diagram 400 may be applied to control channel processing for a device (e.g., an LDC terminal). In this example, four interlaces are available. In other implementations, there may be fewer or more interlaces available.

In this example, state 402 may be a sleep mode, state 408 may be an acquisition mode, state 414 may be an interlace 0 detect state, state 420 may be an interlace 1 detect state, state 424 may be slot processing state, state 432 may be an interlace 2 detect state, and state 438 may be an interlace 3 detect state.

As illustrated by transition 404, the device may remain in state 402 until a wakeup condition occurs. A wakeup condition may be based, at least in part, on time. After waking up from sleep mode at state 402, transition 406 leads to state 408, wherein the device may perform initial acquisition before control channel detection begins. Transition 410 may keep the device in state 408, for example, until a control channel slot 0 boundary is identified. Transition 412 may occur when a control channel slot 0 boundary is identified, and leads device to state 414.

In states 414, 420, 432, and 438, determination of a control bit for each applicable interlace may begin with control channel (CC) preamble detection for the respective interlace. If a control channel packet is detected, a control bit or the like for the respective interlace may be set indicating that the RF receive chain may remain on for successive slots of this respective interlace. If a control channel packet is detected for the respective interlace, then it is possible that the control channel message may be fragmented and may therefore occupy the next respective interlace.

Upon transition (e.g., via a transition 418, 430, or 436) to the next respective state, control channel preamble detection may then begin for the next respective interlace, and if detected a control bit or the like for next respective interlace may be set. This process sequentially continues for the remaining interlaces as long as control channel packets are detected. Otherwise a transition 422, 434 or 440 may occur to place the device in state 424 wherein command channel information may be demodulated and decoded for the active interlace(s).

From state 414, transition 416 places the device in state 402 (sleep mode) if no interlace 0 RF control bit is detected. Thus, transitions 416, 422, 428, 434, and/or 440 may provide conditions for disabling one or more of circuits 210 (and/or 211). Transition 442 places the device in state 424 with the command channel being detected in all four interlaces. Transition 426 keeps the device in state 424 to allow for processing of the command channel information. Transition 428 returns the device in state 402.

Thus, with the technique of FIG. 4, a control bit or the like may be associated with each interlace and may be used to indicate whether or not control channel detection should even be run on successive slots of an interlace. If a control bit of an interlace is zero, indicating for example that one or more circuits 210/211 may be disabled during an unused interlace, there may be no reason to actually consume still further electrical power as may be required for control channel detection.

Figure 5:
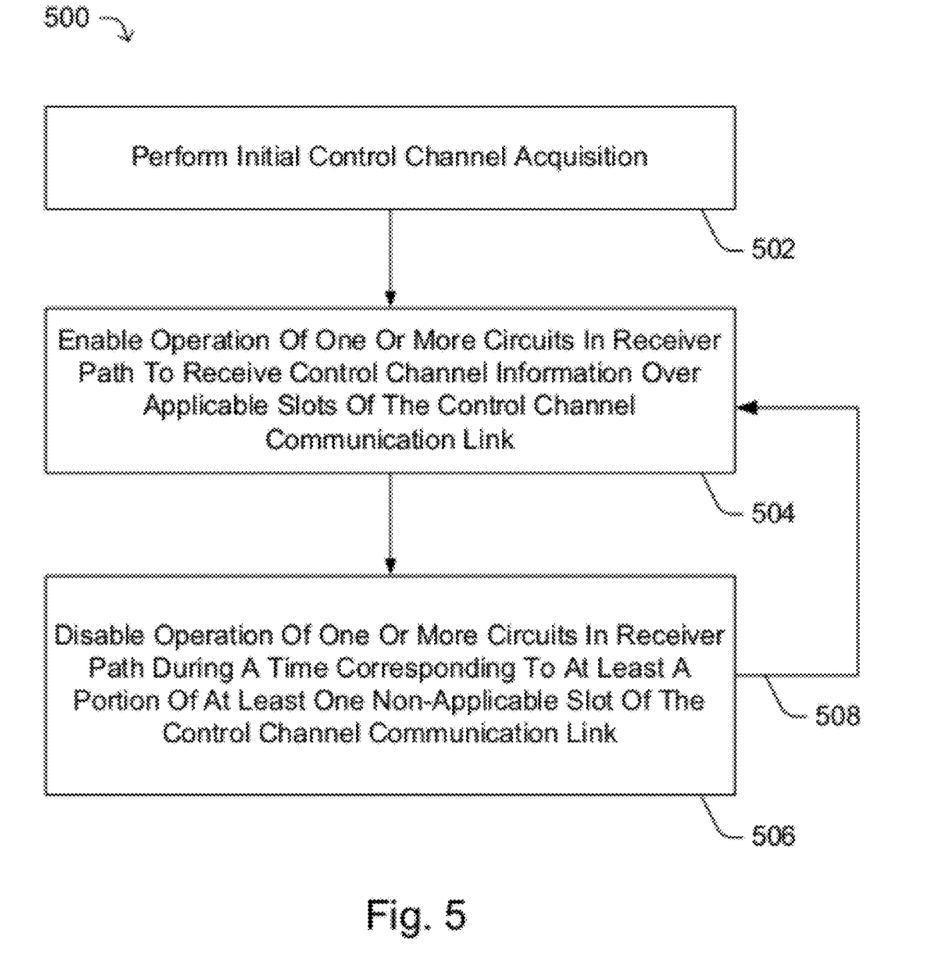
FIG. 5 is a flow diagram illustrating an exemplary method that may be implemented in a device, for example, as in FIG. 2, to receive control channel information over a link having a plurality of interlaced slots.

Attention is drawn next to FIG. 5, which is a flow diagram illustrating an exemplary method 500 that may be implemented in device 102, for example, to receive control channel information over a link having a plurality of interlaced slots. At block 502, an initial control channel acquisition may be performed to identify if applicable control channel information is being transmitted. At block 504, one or more circuits 210 and/or 211 may be enabled to operate to receive at least a portion of the applicable control channel information over applicable slots of the link. At block 506, one or more circuits 210 and/or 211 may be disabled during a time corresponding at least to a portion of at least one non-applicable slot of the link. As illustrated by arrow 508, method 500 may repeat blocks 504 and 506.

Thus, as presented in this description, in accordance with certain example implementations, all or part of method 500 may be implemented within device 102 to allow control channel information 200 to be received using a receiver path 204. Control channel information 200 may, for example, be transmitted over link 302. link 302 may include a plurality of slots. Slots 302 may include applicable slots (e.g., 304-1 . . . 304-*n*) interlaced with non-applicable slots (e.g., 306-*n*, 308-*n*, 310-*n*). Control channel information 200 may, for example, be transmitted over at least a portion of the applicable slots (e.g., 304-1 . . . 304-*n*). The method may be implemented to allow for the operation of one or more circuits 210 and/or 211 in the receiver path 204 to be disabled during certain time periods (e.g., 312, 314) corresponding to at least a portion of at least one of the non-applicable slots.

In certain example implementations, controller 212 may be provided to disable operation of one or more circuits 210/211 in receiver path 204. Controller 212 may, for example, include one or more processing units 214 that may be responsive to computer readable instructions 220. Computer readable instructions 220 may, for example, be stored in memory 216 and/or other like computer readable medium 222. Computer readable medium 222 may take the form of an article of manufacture.

In certain example implementations, controller 212 may be enabled to establish if a decision to conserve power 218 may be desired prior to disabling operation of the one or more circuits in the receiver path 204. A decision to conserve power 218 may, for example, be established dynamically or may be pre-established.

In certain example implementations, disabling the operation of the one or more circuits 210/211 may include powering-down at least a portion of such circuit(s). The operation of such circuit(s) may, for example, be selectively disabled or enabled based, at least in part, on the decision to conserve power 218.

The techniques provided herein may be implemented following and/or as part of an initial control channel acquisition process. The techniques may, for example, be implemented in a LDC terminal. The techniques may be implemented in a CDMA network modem that may be operatively enabled to support wireless data communication via a CDMA2000 1xEV-DO network.

In certain example implementations, device 102 may include SPS interface 240 and control channel information 200 may include ephemeris data 230 associated with SPS 106, which may include at least one GNSS.

The techniques described herein may be implemented by various means depending upon the application. For example, these methodologies may be implemented in hardware, firmware, software, or a combination thereof. For a hardware implementation, all or part of device 102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may, for example, be implemented with modules (e.g., procedures, functions, and so on) that perform the functions described herein. Any machine or computer readable medium tangibly embodying instructions may, for example, be used in implementing certain techniques, at least in part, as described herein. For example, software codes or instructions and other data may be stored in memory, for example memory 216, and executed by processing unit 214 or other like circuits within device 102. As used herein the term "memory" refers to any type of long term, short term, volatile, nonvolatile, or other memory and is not to be limited to any particular type of memory or number of memories, or type of media upon which information may be stored.

In certain exemplary implementations, the functions described herein may be implemented in hardware, software, firmware, or any combination thereof. If implemented in software, the functions may be stored on or transmitted over as one or more instructions or code on a computer-readable medium (e.g., 222). Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
    receiving a control channel in a receiver path of a device over a link comprising a plurality of series of slots that are interlaced;
    determining that a control message for said device occupies two or more of said plurality of series of slots based, at least in part, on a detected presence of a control channel preamble in each of said two or more series of slots;
    determining that at least one of said plurality of series of slots is not occupied by said control message based, at least in part, on a detected absence of said control channel preamble in said at least one of said plurality of series of slots; and
    subsequently enabling operation of one or more circuits in a receiver path of said device during a first time corresponding to at least said two or more of said plurality of series of slots, and disabling said operation of one or more circuits in said receiver path during a second time corresponding to at least a portion of said at least one of said plurality of series of slots.

2. The method as recited in claim 1, wherein disabling said operation of said one or more circuits comprises powering-down at least a portion of said one or more circuits.

3. The method as recited in claim 1, wherein disabling said operation of said one or more circuits is selectively implemented based, at least in part, on a decision to conserve power.

4. The method as recited in claim 1, wherein receiving said control channel comprises performing an initial control channel acquisition.

5. The method as recited in claim 1, wherein said device comprises a Low Duty Cycle (LDC) terminal.

6. The method as recited in claim 1, wherein said receiver path is part of a CDMA network modem.

7. The method as recited in claim 6, wherein said CDMA network modem is operatively enabled to support wireless data communication via a CDMA2000 1xEV-DO network.

8. The method as recited in claim 1, wherein said one or more circuits comprises at least a portion of an analog RF receive-chain and/or at least a portion of a baseband digital receive-chain.

9. The method as recited in claim 1, wherein said control message comprises ephemeris data associated with an SPS.

10. The method as recited in claim 9, wherein said SPS comprises a GNSS.

11. An apparatus comprising:
    means for receiving a control channel over a link comprising a plurality of series of slots that are interlaced;
    means for determining that a control message for use by said apparatus occupies two or more of said plurality of series of slots based, at least in part, on a detected presence of a control channel preamble in each of said two or more series of slots;
    means for determining that at least one of said plurality of series of slots is not occupied by said control message based, at least in part, on a detected absence of said control channel preamble in said at least one of said plurality of series of slots;
    means for subsequently enabling operation of at least a portion of said means for receiving said control channel during a first time corresponding to at least said two or more of said plurality of series of slots; and
    means for disabling said operation of at least a portion of said means for receiving said control channel during a second time corresponding to at least a portion of at least one of said plurality of series of slots.

12. The apparatus as recited in claim 11, wherein said means for disabling said operation of at least a portion of said means for receiving said control channel is selectively implemented based, at least in part, on a decision to conserve power.

13. The apparatus as recited in claim 11, wherein said apparatus comprises a Low Duty Cycle (LDC) terminal.

14. The apparatus as recited in claim 11, wherein said means for receiving control channel information is operatively enabled to support wireless data communication via a CDMA2000 1xEV-DO network.

15. The apparatus as recited in claim 11, wherein said control message comprises ephemeris data associated with an SPS.

16. An apparatus comprising:
    a receiver path comprising one or more circuits, said receiver path to receive a control channel over a link, said link comprising a plurality of series of slots that are interlaced; and
    a controller coupled to at least a portion of said one or more circuits in said receiver path, said controller to:
        determine that a control message for said device occupies two or more of said plurality of series of slots based, at least in part, on a detected presence of a control channel preamble in each of said two or more series of slots;
        determine that at least one of said plurality of series of slots is not occupied by said control message based, at least in part, on a detected absence of said control channel preamble in said at least one of said plurality of series of slots; and
        subsequently enable operation of said one or more circuits in said receiver path during a first time corresponding to at least said two or more of said plurality of series of slots, and disable operation of said one or more circuits in said receiver path during a second time corresponding to at least a portion of at least one of said plurality of series of slots.

17. The apparatus as recited in claim 16, said controller to disable operation of said one or more circuits by powering-down at least a portion of said one or more circuits.

18. The apparatus as recited in claim 16, said controller to further selectively disable said operation of said one or more circuits based, at least in part, on a decision to conserve power.

19. The apparatus as recited in claim 16, wherein said apparatus comprises a Low Duty Cycle (LDC) terminal.

20. The apparatus as recited in claim 16, wherein said receiver path is part of a CDMA network modem.

21. The apparatus as recited in claim 20, said CDMA network modem to support wireless data communication via a CDMA2000 1xEV-DO network.

22. The apparatus as recited in claim 16, wherein said one or more circuits comprises at least a portion of an analog RF receive-chain and/or at least a portion of a baseband digital receive-chain.

23. The apparatus as recited in claim 16, wherein said control message comprises ephemeris data associated with an SPS.

24. The apparatus as recited in claim 23, wherein said SPS comprises a GNSS.

25. An article of manufacture comprising:
a non-transitory computer readable medium having stored thereon computer readable instructions executable by one or more processing units in a device to:
determine that a control message for said device occupies two or more of a plurality of series of slots that are interlaced in a received control channel based, at least in part, on a detected presence of a control channel preamble in each of said two or more series of slots;
determine that at least one of said plurality of series of slots is not occupied by said control message based, at least in part, on a detected absence of said control channel preamble in said at least one of said plurality of series of slots; and
subsequently enable operation of one or more circuits in a receiver path of said device during a first time corresponding to at least said two or more of said plurality of series of slots, and disable operation of said one or more circuits in said receiver path during a second time corresponding to at least a portion of said at least one of said plurality of series of slots.

26. The article of manufacture as recited in claim 25, wherein said computer readable instructions are further executable by said one or more processing units to initiate powering-down at least a portion of said one or more circuits to disable operation of said one or more circuits in said receiver path.

27. The article of manufacture as recited in claim 25, wherein said computer readable instructions are further executable by said one or more processing units to selectively disable said operation of said one or more circuits based, at least in part, on a decision to conserve power.

28. The article of manufacture as recited in claim 25, wherein said receiver path is part of a Low Duty Cycle (LDC) terminal.

29. The article of manufacture as recited in claim 25, wherein said receiver path is part of a CDMA network modem.

30. The article of manufacture as recited in claim 29, said CDMA network modem to support wireless data communication via a CDMA2000 1xEV-DO network.

31. The article of manufacture as recited in claim 25, said one or more circuits comprises at least a portion of an analog RF receive-chain and/or at least a portion of a baseband digital receive-chain.

32. The article of manufacture as recited in claim 25, wherein said control message comprises ephemeris data associated with an SPS.

33. The article of manufacture as recited in claim 32, wherein said SPS comprises a GNSS.

\* \* \* \* \*